(12) United States Patent
Zscheile, Jr. et al.

(10) Patent No.: US 6,847,619 B2
(45) Date of Patent: Jan. 25, 2005

(54) DUAL MODE OF OPERATION MULTIPLE ACCESS SYSTEM FOR DATA LINK COMMUNICATION

(75) Inventors: John Walter Zscheile, Jr., Rockledge, FL (US); Ryan Christopher Reid, Cocoa, FL (US); John Schofield Buzby, Jr., Marina Del Rey, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 259 days.

(21) Appl. No.: 09/854,104

(22) Filed: May 11, 2001

(65) Prior Publication Data

US 2002/0167959 A1 Nov. 14, 2002

(51) Int. Cl.⁷ .............................. H04B 7/212
(52) U.S. Cl. ............. 370/322; 370/458; 370/442; 455/435.3; 455/450; 455/455
(58) Field of Search .................. 370/310, 321–324, 370/345, 347, 348, 442, 443, 444, 458, 459, 461, 462; 455/436, 450, 455, 435.3, 417

(56) References Cited

U.S. PATENT DOCUMENTS

| 5,197,125 A | 3/1993 | Engle |
| 5,561,669 A | 10/1996 | Lenny |
| 5,729,542 A | 3/1998 | Dupont |
| 5,742,592 A | 4/1998 | Scholefield |
| 5,752,193 A | 5/1998 | Scholefield |
| 5,901,363 A | 5/1999 | Toyryla |
| 5,903,848 A | 5/1999 | Takahashi |
| 6,026,083 A | 2/2000 | Abrow |
| 6,061,559 A | * 5/2000 | Eriksson et al. ............. 455/450 |
| 6,208,626 B1 | * 3/2001 | Brewer ....................... 370/310 |
| 6,381,228 B1 | * 4/2002 | Prieto et al. ................ 370/443 |

FOREIGN PATENT DOCUMENTS

EP 0545533 9/1993

OTHER PUBLICATIONS

Chew et al, A Multiple Access Protocol for Wireless ATM networks, Sep. 19–22, 1999, IEEE, pp. 1715–1719.*
Chew et al, Demand Assigned Multiple Access Protocol for Wireless ATM networks, 2000, IEEE, pp. 237–241.*

* cited by examiner

*Primary Examiner*—Duc Ho
*Assistant Examiner*—Phuongchau Ba Nguyen
(74) *Attorney, Agent, or Firm*—Stetina Brunda Garred & Brucker

(57) ABSTRACT

In a data link communications system there is provided a dual mode of operation multiple access system for communication between a plurality of spoke stations and a central hub station which generates a spoke epoch time comprising a plurality of time division slots in which a spoke station can communicate a priority interrupt request to the central hub station. The spoke epoch time comprises one or more dedicated spoke time slots in which only one hub station may transmit to the hub station to the exclusion of all other spoke stations. The spoke epoch time further comprising one or more priority interrupt request time slots in which all spoke stations can transmit priority interrupt requests to the hub station. Controller means in the hub station provides for evaluating priority interrupt requests from the spoke stations and for granting transmission access to one of said spoke stations during predetermined time slots in the next spoke epoch time.

19 Claims, 8 Drawing Sheets

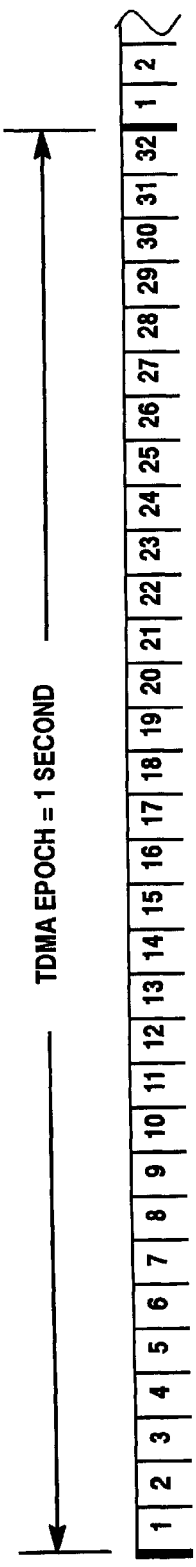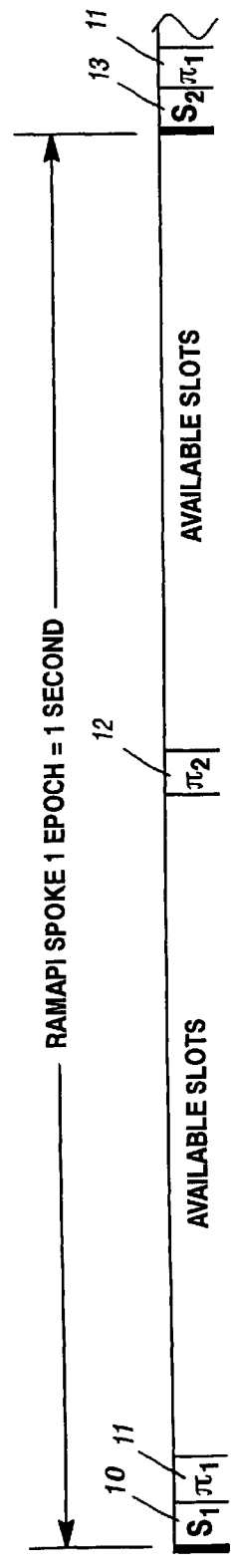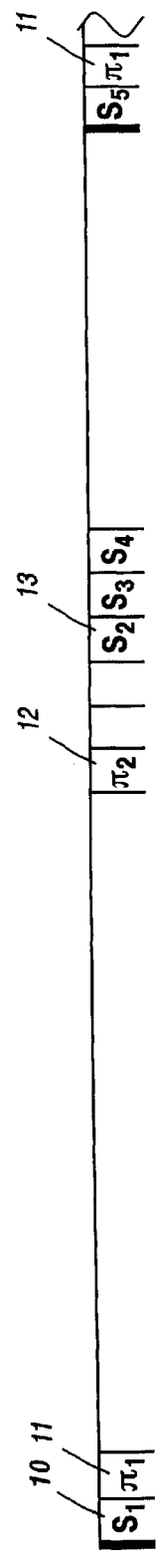

SPOKE SLOT BYTE ASSIGNMENTS:

| | |
|---|---|
| SPOKE STATION RESYNC TIME | 8 |
| DOWN LINK QUALITY OF CHANNEL | 1/2 |
| MESSAGE TYPE ("0" → NO MESSAGE) | 1 |
| MESSAGE DESTINATION | 1 |
| MESSAGE PRIORITY | 1/2 |
| MESSAGE LENGTH | 3 |
| MISCELLANEOUS | 5 |
| CRC | 1 |
| TOTAL | 20 BYTES |

*Figure 4*

PRIORITY REQUEST BYTE ASSIGNMENTS:

| | |
|---|---|
| SPOKE STATION RESYNC TIME | 8 |
| MESSAGE PRIORITY | 1 |
| MESSAGE LENGTH | 3 |
| SPOKE ID | 1 |
| MISCELLANEOUS | 6 |
| CRC | 1 |
| TOTAL | 20 BYTES |

*Figure 5*

HUB CONTROLLER BYTE ASSIGNMENTS:

| | |
|---|---|
| SPOKE EPOCH I.D. | 1 |
| SLOT ASSIGNMENT (UP TO 30 SLOTS) | 45 |
|   – SPOKE STATION I.D. | 1 } UP TO |
|   – SPOKE DATA RATE | 1/2 } 30 X 1½ |
| PRIORITY INTERRUPT THRESHOLD | 1 |
| PI SPOKE MESSAGE WAS RECEIVED | 10 |
| ALLOWED MESSAGE TYPE | 1 |
| QUEUE DEPTH (# SLOTS RESERVED) | 2 |
| STATION OFFSET TIMING ERROR | 32 |
| MISCELLANEOUS | 34 |
| CRC | 2 |
| TOTAL | 128 BYTES |

DUAL MODE OF OPERATION MULTIPLE ACCESS SYSTEM FOR DATA LINK COMMUNICATION

This invention was made with Government support under Contract No. F19628-99-C-0011 awarded by U.S. Air Force Electronic Systems Center. The Government has certain rights in this invention.

BACKGROUND OF THE INVENTION

1. Field of the Invention

The present invention relates to communication data links of the type employed between airborne hub and ground and/or airborne spoke stations. More particularly, the present invention relates to a novel dual protocol system which optimizes data flow of all different types of messages without regard to their length.

2. Description of the Prior Art

It is known that airborne surveillance platforms are used to capture optical images, infrared images and/or radar images and to process the sensed information into a digital format for communication to ground stations and other airborne stations.

The most commonly used protocol for transmitting such data heretofore has been Time Division Multiple Access (TDMA). While there are variations of TDMA protocols, all allot a dedicated time slot to each of the spoke stations that is the only time in which the ground station may transmit requests, messages and data to the hub. The spoke stations are usually designed for always-on reception. It is recognized that TDMA works well when the data being transmitted to the hub is short enough to fit into the allotted time slot, but is bad for long messages that do not fit into the time slot and must be broken up and sent piecemeal over extended time periods in a plurality of the dedicated time slots. Further, no known TDMA protocol has the ability to be interrupted by a priority interrupt initiated at the spoke stations.

The protocol designated Demand Assigned Multiple Access (DAMA) has been used in data links. In this system, all spoke stations have no time slots, but must send a request to transmit to the hub station before access is granted. The preferred mode of operation allocates the channel to the spoke station that first requests access during a period when no other spoke station is transmitting to the hub. Usually, the allocation has no priority or time restraint and allows the transmitting spoke station to transmit its message in its entirety without regard to time. It is possible for the spoke station to determine from the data being transmitted from the hub station when the hub's receiver is available or the hub station can inform the spoke station when such access is available. While DAMA protocol solves the latency problem created by long messages in a TDMA environment, it is bad for short messages because the overhead for negotiating and allotting of the channel usually exceeds the time allotted for the TDMA time slots.

Further, it is possible that a remote spoke station cannot raise its request fast enough to compete with closely located spoke stations and is virtually excluded from achieving access to the hub station in a very busy environment.

It is known by those skilled in the data link communications art that TDMA provides the spoke stations with the ability to continuously resynchronize their timing for using spread spectrum signals and virtually eliminates acquisition time. In contrast thereto, DAMA protocol eliminates the ability for the system to rapidly resynchronize spread spectrum signals, thus, most DAMA protocol systems do not use the desirable spread spectrum signals to avoid the time penalty of having to acquire a spread spectrum signal that is out of synchronization and/or has a period of uncertainty longer than the message time.

It has been suggested that Code Division Multiple Access (CDMA) may be employed in data link communication systems. Such systems require the hub station to have a receiver for each spoke station. Alternatively, the hub station can receive and store all of the spoke station signals and subsequently demodulate and despread the signals using a demodulator/despreader whose speed is N times the plural receiver system speed, where N is the number of spoke stations. In a high-speed data link communication system, CDMA is not a viable solution.

Thus, it would be highly desirable to provide a protocol and system which eliminates the undesirable features of TDMA, DAMA and CDMA data link systems and optimize the throughput of data from spoke stations to a hub station in a high speed data link communication system.

SUMMARY OF THE INVENTION

The principal object of the present invention is to provide a Request Assigned Multiple Access data link communication system with Priority Interrupt (RAMAPI).

A principal object of the present invention is to provide a point-to-network central node data link system that minimizes latency time of transmission of data and optimizes data throughput.

A principal object of the present invention is to provide a novel protocol system for a data link communication system that optimizes transmission time of both long and short messages.

A principal object of the present invention is to provide a novel protocol system for a data link communication system that retains the feature of periodic resynchronization of PN codes by revisiting each spoke station for a predetermined time.

A principal object of the present invention is to provide a novel protocol system that retains the actual time allocated for a spoke station's time slot and only revisits one spoke station during a TDMA spoke epoch time.

A principal object of the present invention is to provide a novel dynamic hub epoch time that comprises one spoke epoch time for each spoke station.

A principal object of the present invention is to provide a novel spoke slot interrupt time in each spoke epoch in which all spoke stations are permitted to raise a priority interrupt request and to transmit short messages.

A principal object of the present invention is to provide a novel hub station priority controller for determining a high priority request received from the spoke stations and to allocate all available slot times in a spoke epoch time to one or more messages from spoke stations based on the evaluation of all priority requests not yet satisfied.

A principal object of the present invention is to provide a novel hub station priority controller that reevaluates all new priority requests and incompleted priority requests each spoke epoch time.

A principal object of the present invention is to provide a novel hub station priority controller that shifts mode of operation from completing priority requests to a TDMA mode of operation when no priority request exists and shifts back to a priority request mode of operation upon receipt of a new priority request.

A principal object of the present invention is to provide a novel hub station priority controller that will accept an override priority interrupt from predetermined ones of the spoke stations which may be transmitted to the hub station during any time slot of an epoch time except the first slot used for resynchronizing the spoke stations.

According to these and other objects of the present invention there is a provided a novel data link communications and protocol system which permits priority interrupts and override priority interrupts from spoke stations to a hub station comprising a novel hub station priority controller that generates spoke epochs and allots one time slot each spoke epoch time for one spoke station reserving the remaining spoke epoch time slots for transmission of inbound data from the spoke stations to the hub stations based on a priority evaluation system. The priority controller further comprises a system for generating a dynamic hub epoch time which comprises one spoke epoch time for each spoke on the system, thus, the number of spoke stations "N" times a spoke epoch time adjusts the hub epoch time and optimizes the time available for transmission of data from spoke stations while implementing a dual priority allocation system.

BRIEF DESCRIPTION OF THE DRAWINGS

FIG. 1 is a block diagram representation of a prior art TDMA epoch time showing one time slot for each spoke station;

FIG. 2A is a block diagram representation of the present invention RAMAPI epoch time showing one time slot for only one spoke station during each epoch time and a novel priority interrupt slot time;

FIG. 2B is a modified block diagram of the FIG. 2A embodiment epoch time showing a plurality of spoke time slots of different spoke stations dispersed throughout an epoch time;

FIG. 4 is a table showing the preferred allocation of 8 bit bytes used in a dedicated spoke time slot;

FIG. 5 is a table showing the preferred allocation of 8 bit bytes used in a priority interrupt time slot;

FIG. 6 is a table showing the sequence of specific events and/or the preferred allocation of 8 bit bytes at the hub priority controller during each spoke epoch time;

DESCRIPTION OF THE PREFERRED EMBODIMENTS

Figure 3:
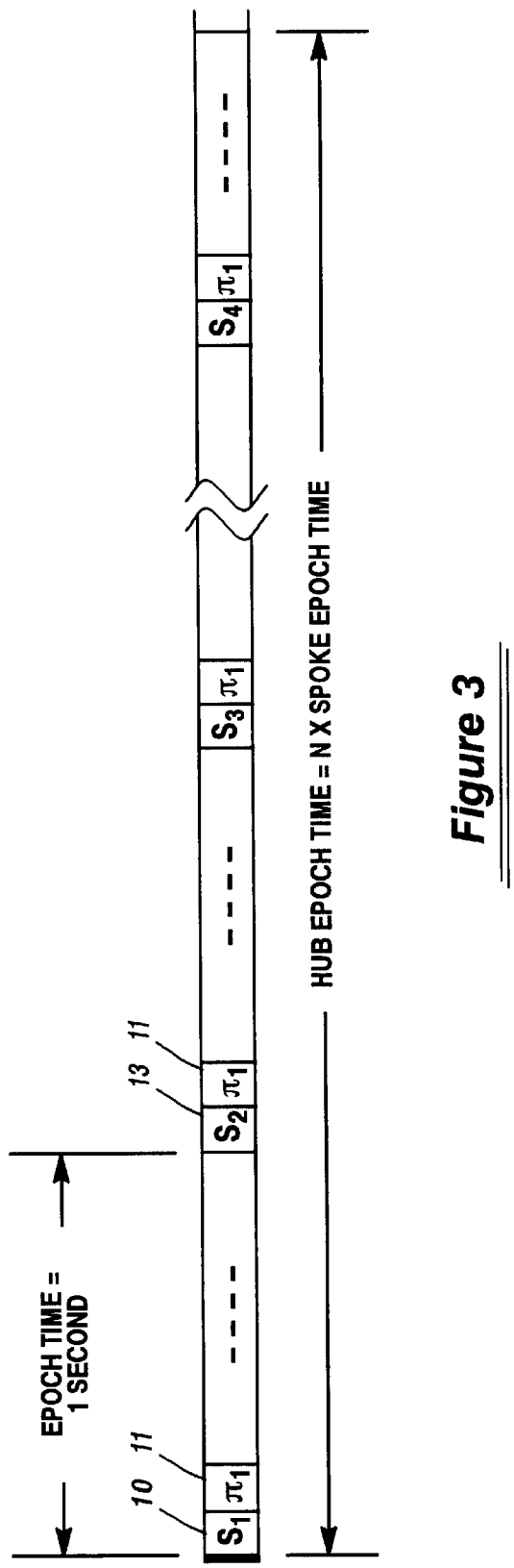
FIG. 3 is a block diagram representation of the present invention dynamic hub epoch time comprising one spoke epoch time for each spoke station on the network system.

Before explaining the drawings it will be known that the inventor is entitled to be his own lexicographer. Accordingly, for purposes of this invention the central control station, which communicates with all remote stations, is usually an airborne platform or a satellite and is designated the hub station. The remote stations may be airborne or ground stations and are designated spoke stations. Spoke stations are designed to communicate with each other via the hub station even though exceptions may exist. During outages or emergencies the spoke stations may communicate directly with another spoke station.

Refer now to FIG. 1 showing a prior art TDMA epoch time. The epoch illustrated is for one second but may be more or less depending on the number of stations and the channel equipment. There are shown 32 station time slots, one for each spoke station in the system. In a TDMA environment each of the spoke stations has a designated time slot during which it may or must transmit information to the hub station which will be explained in greater detail hereinafter. A TDMA protocol is very good for small messages because each station has a time slot in which it can transmit back an entire message to the hub station.

Refer now to FIG. 2A showing a block diagram representation of the present invention RAMAPI spoke epoch time. The TDMA epoch time is employed for one RAMAPI spoke epoch to better illustrate the invention. During the spoke epoch time of one second the spoke station S1 is the only spoke station having a spoke time slot 10 to communicate with the hub station. During the RAMAPI spoke epoch time there is also shown a priority interrupt slot 11 and a priority interrupt slot 12 which occurs somewhere in between the start and finish of a spoke epoch time. The first time slot is always reserved for at least one spoke station as will be explained in greater detail hereinafter. The second spoke epoch time begins with the spoke station S2 time slot shown at 13 and also includes priority interrupt slots 11 and 12 or at least one priority interrupt slot 11.

Refer now to FIG. 2B showing a modified block diagram of the FIG. 2A RAMAPI spoke epoch time and having a plurality of time slots S1, S2, S3, S4 dispersed throughout the spoke epoch time as well as having one or more priority interrupt slots 11 and 12 as explained hereinbefore. Thus, it will be understood that in the preferred embodiment of the present invention the controller in the hub station can reformat the spoke epoch depending on the information available to it so as to optimize the throughput of information from the spoke stations to the hub station.

It should be noted that during priority interrupt time shown at slots 11 and 12 that the uplink channel becomes available to the spoke having the highest priority message. Thus, the spoke stations must transmit a priority for the message and the hub station must determine which spoke station has the highest priority. In the preferred embodiment of the present invention the hub station informs the spoke stations which of the spoke stations interrupt requests were successfully received. This supplies the spoke stations with sufficient information to enable them to raise a new priority request or repeat the previous request during the next priority request slot time.

Refer now to FIG. 3 showing a block diagram representation of a dynamic hub epoch time which comprises one spoke epoch time for each spoke station on the system. In the present invention there are shown N stations, thus the hub epoch time is equal to N seconds. In the preferred embodiment of the present invention, any number of spoke stations may leave the system and the hub epoch time dynamically decreases. Thus, the hub epoch time is reestablished each hub epoch. It is preferred that only one new spoke station may be dynamically added during a hub epoch time, however, there is no reason additional spoke stations cannot be added during a hub epoch time.

Refer now to FIG. 4 showing a table of the preferred allocation of 8 bit bytes used in a dedicated spoke time slot. The spoke slot byte assignments are typical of a preferred embodiment invention, however, the spoke station resync time may use more or less bits depending on the clock timing quality. The down link quality of channel is determined by the strength of the signal received by the spoke station and is used by the hub station to determine the maximum transmission data rate to all stations. The message type designation permits the spoke station to inform the hub station the nature of the message such as email or file transfer. The message priority enables the hub station to discriminate between the importance of messages being requested to be sent by the spoke stations. The message length in bytes supplies the hub station with sufficient information to allocate time slots for the spoke to transmit data back to the hub station. There are shown five miscellaneous bytes which may be used for numerous purposes such as additional data which allows the hub station to determine and discriminate the priority of the various spoke stations. Further, in some environments it may require additional resynchronization time which can be taken from the miscellaneous bytes. The last byte is shown as a circular redundancy check byte which permits the hub station to determine if there is one or more bit errors in the message in which case the whole message is discarded and the hub station informs the spoke station to retransmit the information. Other forms of bit error detection techniques may be employed, however, the CRC is a preferred well-established standard.

Refer now to FIG. 5 showing the preferred allocation of 8 bit bytes used in a priority interrupt request time slot. The spoke station resynchronization time is 8 bytes as explained before. The message priority is the same as explained before. The message length is the same as explained before. One byte is allocated for the spoke station to identify itself. The CRC is the same as explained before and the miscellaneous time is now shown as 6 bytes. In summary, during a priority interrupt request slot time any and all spoke stations may transmit or submit their interrupt request and it is up to the hub station to determine which spoke or spokes will be permitted to transmit in the available slots of the next spoke epoch time.

Refer now to FIG. 6 showing a table of the sequence of specific events transmitted to the spoke stations and/or the preferred allocation of 8 bit bytes at the hub priority controller during each spoke epoch time. The hub controller may reallocate the sequence in which the bytes are shown. The spoke epoch identification employs one byte. The slot allocation employs up to 30 slots and requires 45 bytes shown as comprising a spoke station ID of one byte and a spoke data rate of ½ byte for each of the 30 slots. There is shown a priority interrupt threshold of one byte which informs the spoke stations that the priority level must be at least the threshold level in order to be allowed to transmit during the next priority interrupt. Further, there is transmitted one byte for non-allowed message type during those periods in which certain types of messages are not allowed to be used for a priority interrupt. There is shown a queue depth of 2 bytes which informs the spoke stations the number of unprocessed messages from spoke stations still awaiting permission to transmit. A queue depth is very important when there is heavy congestion and priority requests are stacked in a queue. The station offset timing error is employed to inform each spoke station that transmitted in the previous spoke epoch the amount of offset to be used to resynchronize the spread spectrum signal with the hub station. The miscellaneous and circular redundancy check bytes have been explained hereinbefore and are used for the same purpose.

Figure 7:
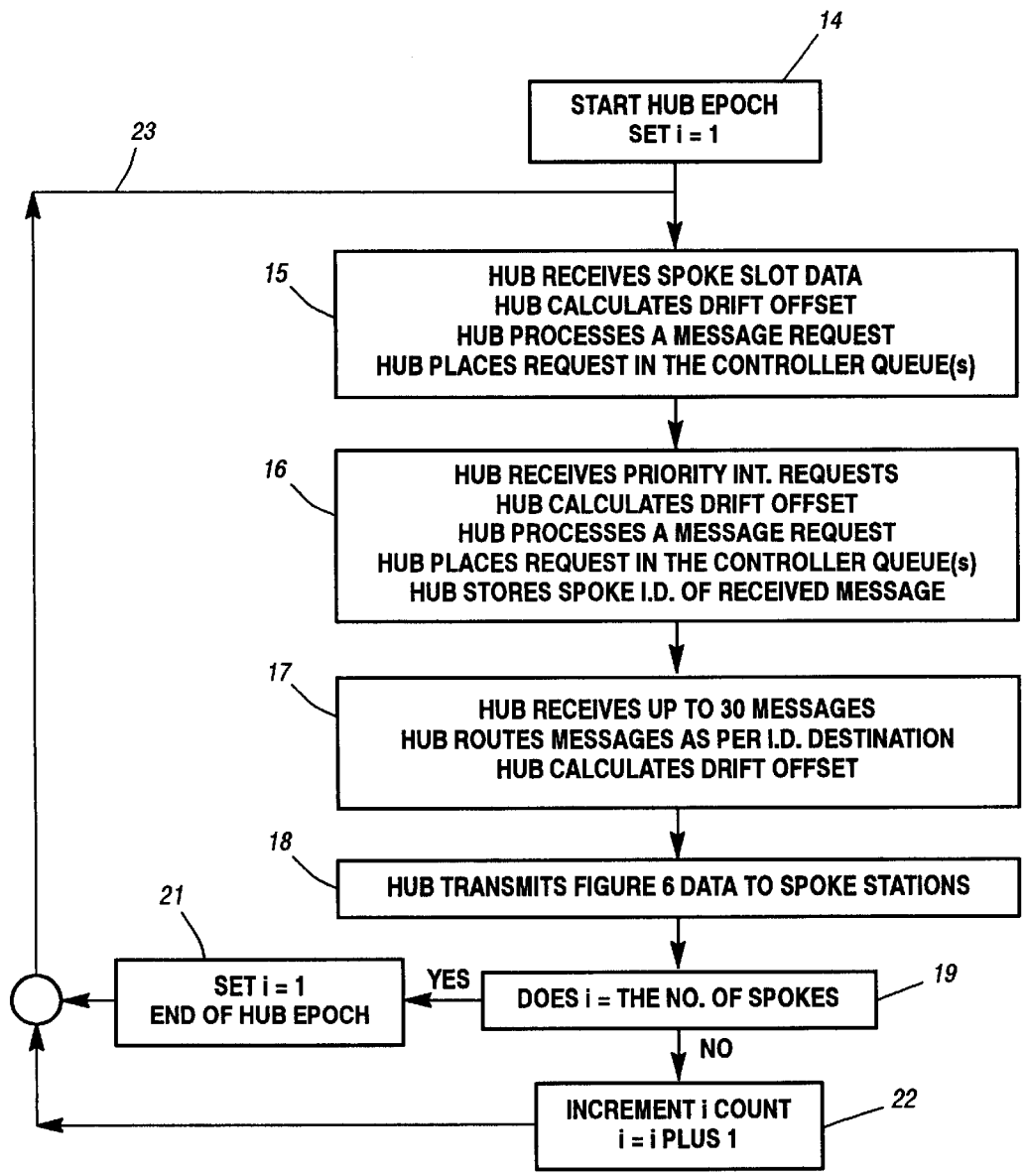
FIG. 7 is a generalized block diagram of events that occur at the hub station controller as a result of data received from the spoke stations during each spoke epoch time.

Refer now to FIG. 7 showing a general block diagram of events that occur at the hub station controller as a result of data received from the spoke stations during each spoke epoch time. To initialize the flow diagram system shown in FIG. 7 it is necessary to set I equal to 1 in block 14 as shown. In block 15 there are shown four different activities at the hub station which are in response to the spoke slot data being received. The spoke slot activities are self-explanatory and do not require additional explanation. The priority interrupt slot block 16 shows the activities which occur at the hub controller as a response to the priority interrupt received. The events that occur in block 16 are also shown in FIG. 5 and the events shown in block 15 are shown in FIG. 4 and are self-explanatory. Block 17 is a message slot block and illustrates or shows the dual mode of operation. If the system is in a TDMA mode of operation the hub station can receive about 32 messages from 32 different spoke stations. However, if the system is in a RAMAPI mode or partial RAMAPI mode fewer messages than 32 will be received from the spoke stations. The hub station routes the messages as per the internet protocol destination address or addresses. In addition, the hub station calculates the drift offset for all stations that have transmitted information during the last spoke epoch time. In the next sequence of operation shown in block 18 the hub transmits the FIG. 6 data back to the spoke stations. In block 19 the hub station determines if the spoke epoch I is equal to the number of spokes in the system. If the decision is yes, then I is set to 1 and this is the end of the hub epoch having successfully guaranteed its communication with all stations S1, S2, $S_N$. If the decision is no in block 19, the number I is incremented by 1 and the entire process shown in FIG. 7 is repeated by the initializing signal shown on line 23. It will be understood that the sequence of events occurring at the hub controller at the hub station shown in FIG. 7 are repeated until the end of a hub epoch at which time a new hub epoch is initiated.

Figure 8:
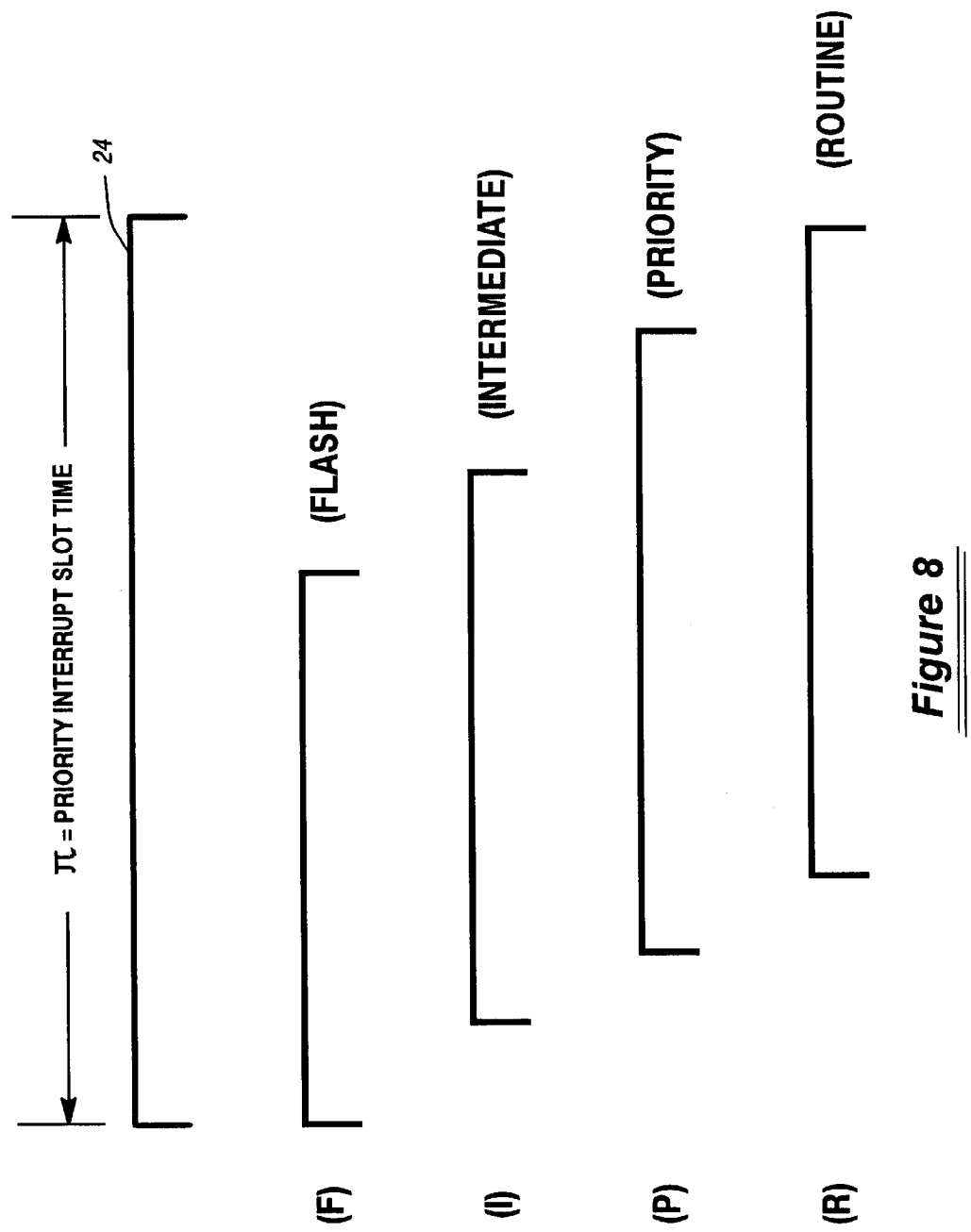
FIG. 8 is a timing diagram showing four typical priorities which are delayed relative to each other by the spoke station before being sent to the hub station so that the highest priority is more easily recognized and demodulated and decoded.

Refer now to FIG. 8 showing a timing diagram of four typical priorities used by the military and designated as F, I, P and R. The spoke stations have a priority interrupt slot time shown at 24. During this slot time any spoke station which has the highest priority or flash or F message can immediately initiate an interrupt request. Similarly, the spoke stations may initiate immediate or I, priority or P, and routine or R priority requests which are offset in delayed time from the start of the priority interrupt slot time. In this manner the hub station will always receive a flash priority request before it will receive an immediate priority or a routine request during the same time slot. Thus, by using the delayed sequence when sending priority requests of different priorities the hub station can ignore all lower priorities knowing that the higher priority interrupt requests will be processed before lower priority request. However, it is possible to store all priority requests. It will be understood that the names of the priorities illustrated in FIG. 8 have been used heretofore and could be substituted for other priorities or more priorities, but the technique of delaying the individual priorities for the purpose of immediately determining the highest priority is completely new.

Figure 9:
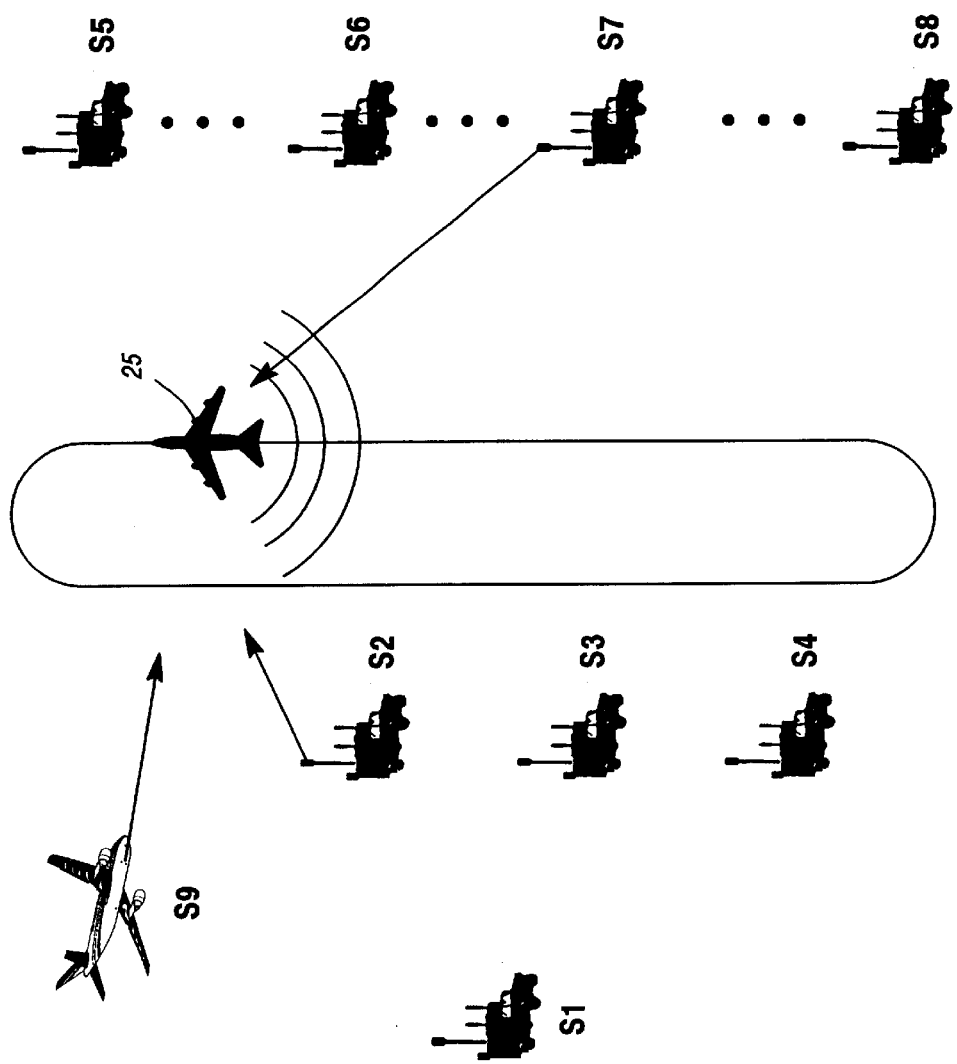
FIG. 9 is a pictorial representation showing a typical hub and spoke environment which permits spoke stations to communicate with each other and with the hub station.

Refer now to FIG. 9 showing a pictorial representation of a typical hub station and spoke station environment which permits the spoke stations to communicate with each other via the hub station. It will be understood that during emergencies if the spoke stations have a line of sight directly between stations they may communicate with each other and avoid the hub station. In the preferred embodiment of the present invention, the hub controller in the hub station is preferably an airborne platform but may be an airborne satellite or may be a hub station placed at a high location such as a mountaintop overlooking the area of interest. The airborne platform 25 with the hub controller is shown orbiting in the area of interest of the network which comprises spoke stations S1 through S9 and other spoke stations not shown. Thus it is illustrated that a spoke station S9 may be an airborne vehicle. When the airborne platform S9 is not attended by a human it is necessary to program its computer for certain events which will trigger a priority interrupt. Thus, it is possible to perform a mission in a desired area of interest using a robot controlled airborne platform which in turn is controlled from a ground station or a spoke station or the hub station.

Having explained a preferred embodiment of the present invention illustrating a TDMA mode of operation and a RAMAPI mode of operation, it will now be understood that the two different modes of operation may be intermingled during the spoke epoch time.

Having explained the preferred mode of operation in which each spoke epoch time contains at least one dedicated spoke slot in which the spoke station system may be resynchronized and/or the spoke station may raise a priority interrupt, it will be understood that the present invention always improves upon the prior art TDMA mode of operation which had no priority interrupt. Further, the hub station controller can reassign the time slots for the next occurring spoke epoch time so as to optimize the transmission speed for the next set of messages. For example, more than one spoke slot intermingled with more than one priority interrupt slot may be formatted into a single spoke epoch time. Further, in a modified preferred mode of operation certain selected spoke stations are provided with the ability to raise an override priority interrupt which may be transmitted during any time slot available to the spoke station having the right to raise an override priority. In such event if a message is interrupted by the override priority interrupt it may be possible that it could complete its transmission or that it needs to be retransmitted as the case may be. If the message being interrupted is not completely received, the hub station requests retransmission of the complete message.

What is claimed is:

1. A dual protocol mode of operation multiple access system for spread spectrum data link communication between a central hub station and a plurality of spoke stations, comprising:
    means in said spoke stations for generating priority request interrupts during a spoke epoch time having a plurality of time division slots,
    said spoke epoch time comprising one or more dedicated spoke time slots in which each spoke stations can transmit data or requests with priorities to said central hub station to the exclusion of all other spoke stations,
    said spoke epoch time further comprising one or more spoke priority interrupt request time slots in which all spoke stations can simultaneously transmit spread spectrum priority interrupt requests to said central hub station without collisions,
    controller means in said central hub station for evaluating said plurality of spoke station interrupt requests,
    means in said central hub station for granting transmission access to one of said spoke stations requests during predetermined time slots in the next spoke epoch time to the exclusion of all other spoke stations, and
    said means for granting transmission access including means for resynchronizing timing in said spoke station.

2. A dual mode of operation multiple access system as set forth in claim 1 wherein said spoke epoch time includes at least one dedicated spoke time slot and at least one spoke priority interrupt request time slot.

3. A dual mode of operation multiple access system as set forth in claim 2 which further includes means in said spoke stations for generating a message length and a priority with each interrupt request.

4. A dual mode of operation multiple access system as set forth in claim 1 wherein said means for generating a priority interrupt request comprises means for delaying different priorities by different time amounts.

5. A dual mode of operation multiple access system as set forth in claim 4 wherein the highest priority interrupt request is delayed the least amount of time and lesser priorities are delayed increasing amounts of time.

6. A dual mode of operation multiple access system as set forth in claim 4 wherein said hub station controller comprises means for assigning spoke time slots to any time division slot in a spoke epoch time.

7. A dual mode of operation multiple access system as set forth in claim 6 wherein said hub station controller assigns all available time division slots of a spoke epoch to different spoke stations and a mode of operation emulates a Time Division Multiple Access (TDMA) mode of operation with a priority interrupt.

8. A dual mode of operation multiple access system as set forth in claim 6 wherein said hub station controller assigns all available time division slots to the transmission of data from spoke stations and the mode of operation emulates a Request Assigned Multiple Access with Priority Interrupt (RAMAPI) mode of operation.

9. A dual mode of operation multiple access system as set forth in claim 6 wherein said hub station controller may assign any available time slot to different spoke stations for a TDMA mode of operation or to data transmission from said spoke stations in a RAMAPI mode of operation so as to emulate one of two modes of operation or incorporate both modes of operation.

10. A dual mode of operation multiple access system as set forth in claim 1 which further comprises means in selective ones of said spoke stations for generating an override priority request in any time slot except the dedicated time slots of the spoke epochs used for resynchronizing timing.

11. A variable dual mode of operation multiple access system for optimizing spread spectrum data transmission between a central hub station and a plurality of spoke stations, comprising:
    a hub station controller for generating a spoke epoch of synchronized spread spectrum time division slots,
    at least one of said spokes epoch of synchronized spread spectrum time division slots including means for a spoke station to generate a priority interrupt,
    said operation multiple access system being operable in a TDMA mode of operation when all said spoke epoch of synchronized spread spectrum time division slots are unique priority interrupt slots, wherein said spoke epoch of synchronized spread spectrum time division slots comprising one or more dedicated spoke time slots in which each spoke stations can transmit data or request with priority to said central hub station to the exclusion of all other spoke stations,
    said spoke epoch of synchronized spread spectrum time divisions slots further comprising one or more spoke priority interrupt request time slots in which all spoke stations can simultaneously transmit spread spectrum priority interrupt requests to said central hub station without collisions, means for resynchronized spectrum timing in said from said central hub station, and said operation multiple access system being operable in a RAMAPI mode of operation when most of said time division slots are assigned to specific spoke stations for transmission of data from a spoke station to said central hub station.

12. A method of transmitting data from a plurality of spoke stations to a hub station using dual modes of operation, comprising the steps of:

transmitting data from said hub station to all spoke stations, transmitting synchronized data from said spoke stations to said hub station only when the hub station assigns time slots for the spoke stations to transmit data to said hub station, transmitting synchronized spread spectrum priority interrupt requests from said spoke stations to said hub station during a predetermined time slot or slots without collisions, determining from the plurality of all priority interrupt requests the spoke station having the highest priority, said hub station assigning to the spoke station with the highest priority a plurality of time slots all of its data and means for synchronizing its spread spectrum timing, and said spoke station transmitting all of its synchronized data to said hub station during the plurality throughout a spoke epoch time.

13. The method as set forth in claim 12 which further comprises the steps of determining from data transmitted from said spoke stations an optimum data rate of transmission, and said hub station further providing to said spoke stations the optimum data rate for the transmission of data.

14. The method as set forth in claim 12 which further includes steps of assigning only one time slot to spoke stations and one time slot for priority interrupt requests and assigning the remaining available time slots to specific spoke stations for transmission of data to the hub station for operation in a RAMAPI mode of operation.

15. The method as set forth in claim 12 which further includes the steps of assigning all available time slots to different spoke stations for transmission of data to the hub station for operation in the TDMA mode of operation.

16. The method as set forth in claim 12 which further includes the step of generating a priority override signal to designated ones of said spoke stations during any time slot other than time slots used for resynchronizing timing.

17. The method as set forth in claim 16 which further includes the step at the hub station of transmitting override priority data to an intended spoke station and informing other spoke stations that an override priority interrupt has occurred.

18. The method as set forth in claim 17 which further includes the step of reassigning time slots to the spoke stations for transmitting data that was interrupted by the override interrupt.

19. The method as set forth in claim 12 which further includes the steps of reassigning spoke station dedicated time slots and priority interrupt time slots throughout a spoke epoch time.

* * * * *